United States Patent
Slot et al.

(10) Patent No.: US 6,457,880 B1
(45) Date of Patent: Oct. 1, 2002

(54) CAMERA AND SHOULDER SUPPORT FOR CARRYING A LOAD

(75) Inventors: Steven T. Slot; Petrus M De Greeuw; Marcus P. Scheepers, all of Breda (NL)

(73) Assignee: Thomson Licensing SA, Boulogne Cedex (FR)

( * ) Notice: Subject to any disclaimer, the term of this patent is extended or adjusted under 35 U.S.C. 154(b) by 739 days.

(21) Appl. No.: 08/834,068

(22) Filed: Apr. 14, 1997

(30) Foreign Application Priority Data

Apr. 12, 1996 (EP) .............................. 96200915

(51) Int. Cl.⁷ .............................. G03B 17/02
(52) U.S. Cl. ..................................... 396/420
(58) Field of Search ................. 396/419, 420, 396/423, 424, 428; 224/201, 600, 601, 257, 264, 265, 266

(56) References Cited

U.S. PATENT DOCUMENTS 3,767,095 A * 10/1973 Jones ........................ 224/261
4,091,975 A * 5/1978 Russell, Jr. ................ 224/265

FOREIGN PATENT DOCUMENTS

GB         2037001 A     7/1980    ......... G03B/17/56
ZA          945052 A     1/1996

* cited by examiner

*Primary Examiner*—David M. Gray
(74) *Attorney, Agent, or Firm*—Joseph S. Tripoli; Harvey D. Fried; Francis A. Davenport

(57) ABSTRACT

A camera (1) a housing (2) and a shoulder support (3) to support the housing (2) on a shoulder. The shoulder support (3) comprises a flexible carrying member (30) having a first end (31 ) and a second end (32). Near its first end (31) the carrying member (30) is connected to the housing (2) by means of a comparatively stiff first connecting member (41) and near its second end (32) it is connected to the housing (2) by means of a comparatively stiff second connecting member (42). The first connecting member (41) is movably coupled to the second connecting member (42) via a hinge (51) and the housing (2). By placing the camera (1) onto a shoulder, the shoulder bearing against the carrying member (30) at a position between the ends (31) and (32) of the carrying member, a pulling force is produced in the carrying member (30), which force acts upon the connecting members (41) and (42) and urges the ends (31) and (32) of the carrying member (30) towards one another. Since the connecting members (41) and (42) are movably coupled, the ends (31) and (32) can move towards one another and the shoulder support (3) exerts a clamping action on the shoulder. As a result of this, the weight of the camera (1) is distributed over a larger shoulder area, so that less pressure is exerted on the shoulder.

10 Claims, 5 Drawing Sheets

CAMERA AND SHOULDER SUPPORT FOR CARRYING A LOAD

FIELD OF THE INVENTION

The invention relates to a camera comprising a housing and a shoulder support for supporting the housing on a shoulder, which shoulder support comprises a flexible carrying member having a first end and a second end and a carrying surface which is remote from the camera and which is adapted to cooperate with a shoulder, which carrying member is connected to the housing by means of a comparatively stiff first connecting member near the first end of said carrying member and is connected to the housing by means of a comparatively stiff second connecting member near the second end of said carrying member.

The invention also relates to a shoulder support for carrying a load on a shoulder.

BACKGROUND OF THE INVENTION

Such a camera and such a shoulder support are known from practice. The shoulder support of the known camera comprises a carrying strap and a metal yoke connecting the two ends of the carrying strap. The yoke comprises a coupling member which couples the shoulder support to the camera. A disadvantage of the known camera is that it does not provide a satisfactory hold on the shoulder. Another disadvantage is that it exerts a substantial pressure on the top of the shoulder. A further disadvantage is that the camera is difficult to poise.

SUMMARY OF THE INVENTION

It is an object of the invention to provide a camera of the type defined in the opening paragraph, which mitigates these disadvantages. To this end, the camera in accordance with the invention is characterized in that the first connecting member is movably coupled to the second connecting member. By placing the camera on a shoulder in such a manner that the shoulder bears against the carrying member at a position between the ends of the carrying member, a pulling force is produced in the carrying member, which force acts upon the connecting members and urges the ends of the carrying member towards one another. Since the connecting members are coupled in such a manner that the ends of the carrying member can move towards one another the shoulder support exerts a clamping action on the front and the back of the shoulder. As a result of this, the weight of the camera is distributed over a larger area of the shoulder, so that less pressure is exerted on the shoulder. Moreover, the clamping action provides a better hold of the shoulder support on the shoulder, so that the camera better follows shoulder movements, for example panning movements about a vertical axis. Moreover, poising the camera on the shoulder is easier since the shoulder support also bears against the front and the back of the shoulder. Moreover, the measures in accordance with the invention ensure a satisfactory fit of the shoulder support over a large range of shoulder dimensions.

An embodiment of the camera in accordance with the invention is characterized in that at least one of the connecting members is hingeably connected to the housing. Thus, the first connecting member is coupled to the second connecting member by a simple and robust construction. In addition, the degree of clamping of the shoulder support on the shoulder can be influenced by appropriately positioning the hinging point of the connecting member.

An embodiment of the camera in accordance with the invention is characterized in that the housing has an underside provided with a mounting surface for mounting the camera onto a stand, and the shoulder support extends near the underside. The shoulder support is situated on the underside of the camera, so that the camera can be placed onto the shoulder. The shoulder support is preferably mounted below the center of gravity of the camera. When a stand is used the stand is preferably also situated below the center of gravity of the camera. Said characteristic feature enables both the mounting surface and the shoulder support to be situated below the center of gravity of the camera.

An embodiment of the camera in accordance with the invention is characterized in that the second connecting member is hingeably secured to the housing. As a result of this measure, the shoulder support can be folded in. In addition, it enables the camera to be moved relative to the carrying member, as a result of which the center of gravity of the camera can be positioned straight above the shoulder. Preferably, the distance between the points about which connecting members are hingeable is selected to be smaller than the distance in the case of placement on a shoulder between the point where the first connecting member is secured to the carrying member and the point where the second connecting member is secured to the carrying member. This enables a virtual pivot to be created which is situated above the center of gravity of the camera, thereby providing a further improvement of the balance of the camera with respect to the shoulder. It has been found that good results are achieved if the distance between the points about which the connecting members are hingeable is selected to be between 8 and 15 cm.

An embodiment of the camera in accordance with the invention is characterized in that the housing has a recess in the underside, and the connecting members are secured to the housing at the location of the recess. As a result of these measures the shoulder support can be accommodated wholly in the recess in its folded-in condition, so that it does not project from the mounting surface. This enables the camera to be mounted directly onto a stand without removal of the shoulder support from the camera. Some cameras have a foam rubber pad, which serves as a shoulder support, fitted in a recess in the underside. It has been found that this foam rubber pad can be replaced by the shoulder support in accordance with the invention, the existing recess being large enough to accommodate the shoulder support.

An embodiment of the camera in accordance with the invention is characterized in that the connecting members have a given length and are each secured to the housing by means of a hinge, and the distance between the hinges is greater than the sum of the lengths of the connecting members. As a result of these measures, the connecting members do not overlap in the folded-in condition, so that the shoulder support occupies only little space in its folded-in condition.

An embodiment of the camera in accordance with the invention is characterized in that the flexible carrying member is hingeably secured to the connecting members. Owing to the measure, the shoulder support can be folded in more easily. Moreover, it enables the center of gravity of the camera to be transferred more easily to a point above the shoulder.

An embodiment of the camera in accordance with the invention is characterized in that the flexible carrying member comprises rubber. Rubber is particularly suited because, apart from being flexible, it is also resilient and has a high coefficient of friction. As a result of the resilience, the shoulder support can be designed in such a manner that it unfolds automatically when not locked and that it can readily be placed onto the shoulder or onto a flat surface in its folded-out condition. Owing to the high coefficient of friction the shoulder support is unlikely to slip off a shoulder.

An embodiment of the camera in accordance with the invention is characterized in that the connecting members are coupled via a coupling mechanism, which couples the movements of the first and the second connecting member. It has been found that such a coupling mechanism improves the stability of the camera with respect to the shoulder. Preferably, the coupling mechanism is constructed in such a manner that the second connecting member folds in when the first connecting member is folded in. As a result, the shoulder support folds in as a whole when the first connecting member is folded in by sliding the camera onto a stand, the first connecting member then being pressed sideways against a stand. This allows the camera to be placed onto a stand in one movement.

The shoulder support in accordance with the invention comprises a coupling member and a flexible carrying member, the flexible carrying member having a first end and a second end and a carrying surface for cooperation with a shoulder, which carrying surface is remote from the coupling member, the flexible carrying member being connected to the coupling member by means of a comparatively stiff first connecting member near the first end of said carrying member, the flexible carrying member being connected to the coupling member by means of a comparatively stiff second connecting member near the second end of said carrying member, and the first connecting member being movably coupled to the second connecting member. The shoulder support in accordance with the invention is suitable for carrying a load on a shoulder. By placing the load with the shoulder support on a shoulder in such a manner that the shoulder bears against the carrying surface of the carrying member at a position between the ends of the carrying member, a pulling force is produced in the carrying member, which force acts upon the connecting members and urges the ends of the carrying member towards one another. Since the connecting members are movably coupled, the ends can move towards one another and the shoulder support exerts a clamping action on the front and the back of the shoulder. As a result of this, the weight of the load is distributed over a larger area of the shoulder, so that less pressure is exerted on the shoulder. Moreover, the clamping action provides a better hold of the shoulder support on the shoulder. Furthermore, poising the load on the shoulder is easier since the shoulder support also bears against the front and the back of the shoulder. In addition, the measures in accordance with the invention ensure a satisfactory fit of the shoulder support over a large range of shoulder dimensions.

BRIEF DESCRIPTION OF THE DRAWINGS

The above and further aspects of the invention will now be described in more detail, by way of example, with reference to the drawings, in which.

DETAILED DESCRIPTION OF THE DRAWINGS

Figure 1:
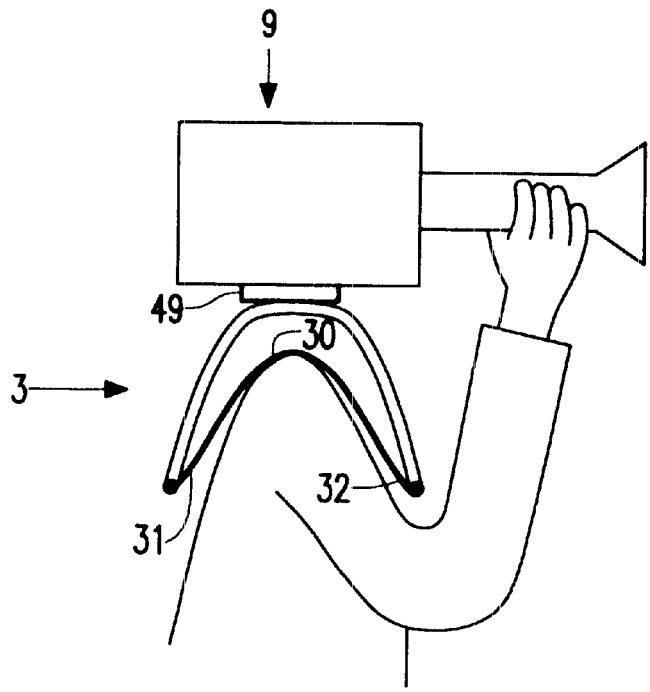
FIG. 1 shows a prior-art camera.

FIG. 1 shows a prior-art camera 9. The shoulder support 3 of the known camera 9 comprises a carrying strap 30 and a metal yoke 40 connecting the two ends 31 and 32 of the carrying strap 30. The yoke 40 comprises a coupling member 49 which couples the shoulder support 3 to the camera 9.

Figure 2:
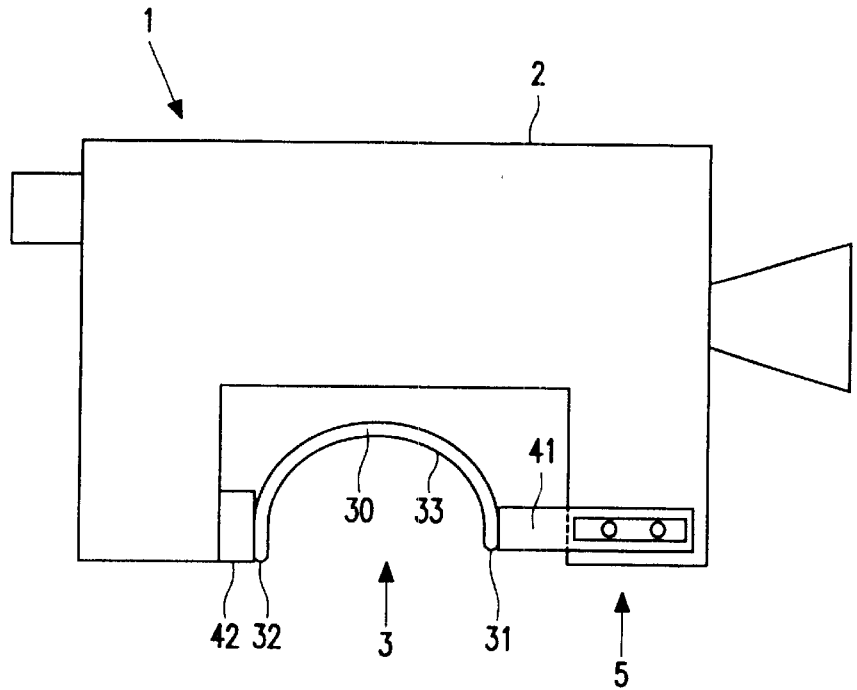
FIG. 2 shows a first embodiment of the camera in accordance with the invention.

FIG. 2 shows a first embodiment of the camera 1 in accordance with the invention, comprising a housing 2 and a shoulder support 3 to support the housing 2 on a shoulder. The shoulder support 3 comprises a flexible carrying member 30 having a first end 31 and a second end 32 and a carrying surface 33 for cooperation with a shoulder, which surface is remote from the camera 1. Near its first end 31 the carrying member 30 is connected to the housing 2 by means of a comparatively stiff first connecting member 41 and near its second end 32 it is connected to the housing 2 by means of a comparatively stiff second connecting member 42. The first connecting member 41 is movably coupled to the second connecting member 42 via a guide 5 and the housing 2.

Figure 3:
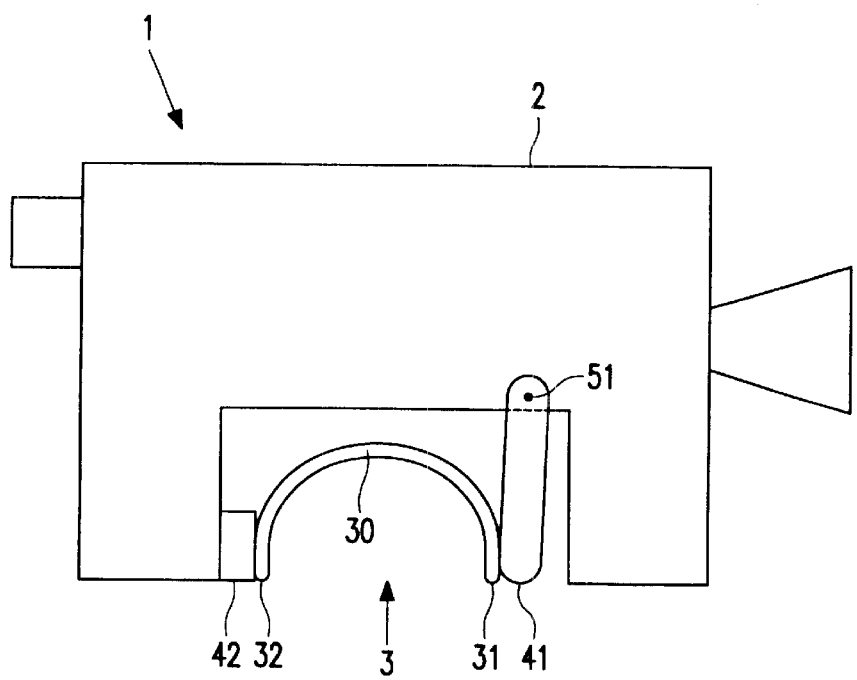
FIG. 3 shows a second embodiment of the camera in accordance with the invention.

FIG. 3 shows a second embodiment of the camera in accordance with the invention. The first connecting member 41 is movably coupled to the second connecting member 42 via a hinge 51 and the housing 2. By arranging the hinge 51 farther from the second end 32 the degree of clamping of the shoulder support 3 on the shoulder can be increased.

Figure 4:
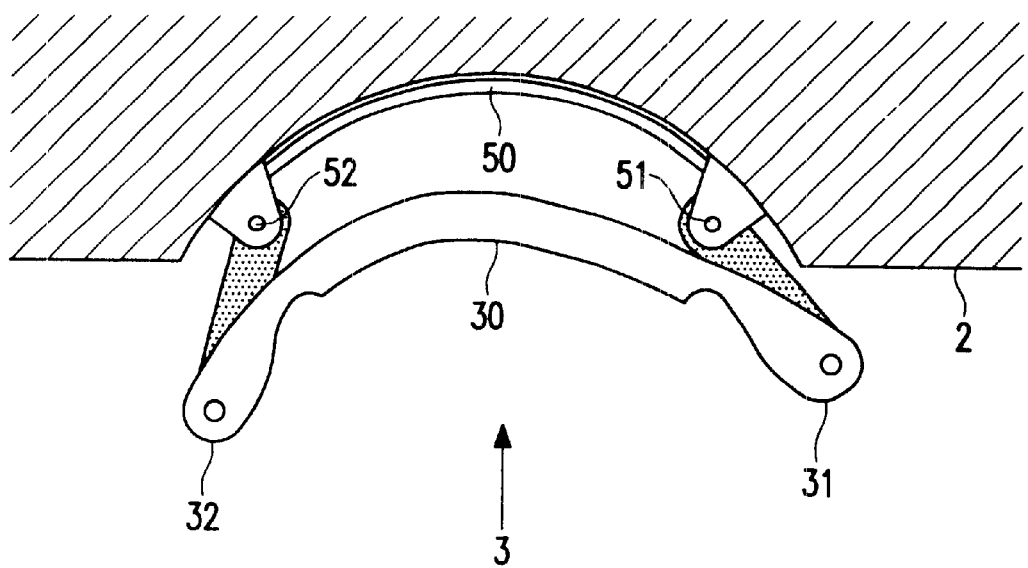
FIG. 4 shows a detail of a third embodiment of the camera in accordance with the invention.

FIG. 4 shows a detail of a third embodiment of the camera in accordance with the invention. The third embodiment of the camera 1 in accordance with the invention is characterized in that the first connecting member 41 is secured to the housing 2 via a hinge 51, in the present case by means of a coupling member 50, and the second connecting member 42 is secured to the housing 2 via a hinge 52, in this case also by means of a coupling member 50. These hinges 51 and 52 enable the shoulder support to be folded in.

Figure 5:
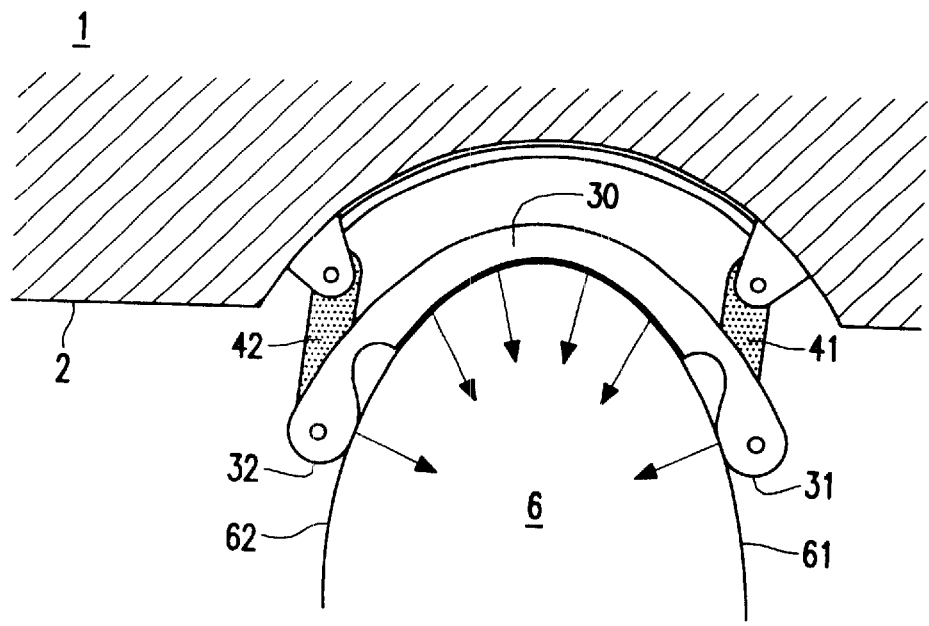
FIG. 5 illustrates how the shoulder support is supported on a shoulder.

FIG. 5 shows a detail of a third embodiment of the camera in accordance with the invention while the camera rests on a shoulder 6. By placing the camera 1 onto the shoulder 6, the shoulder 6 bearing against the carrying member 30 at a position between the ends 31 and 32 of the carrying member, a pulling force is produced in the carrying member 30, which force acts upon the connecting members 41 and 42 and urges the ends 31 and 32 of the carrying member 30 towards one another. Since the connecting members 41 and 42 are movably coupled, the ends 31 and 32 can move towards one another and the shoulder support 3 exerts a clamping action on the front 61 and the back 62 of the shoulder 6. As a result of this, the weight of the camera is distributed over a comparatively large area of the shoulder 6, so that a comparatively low pressure is exerted on the shoulder 6.

Figure 6:
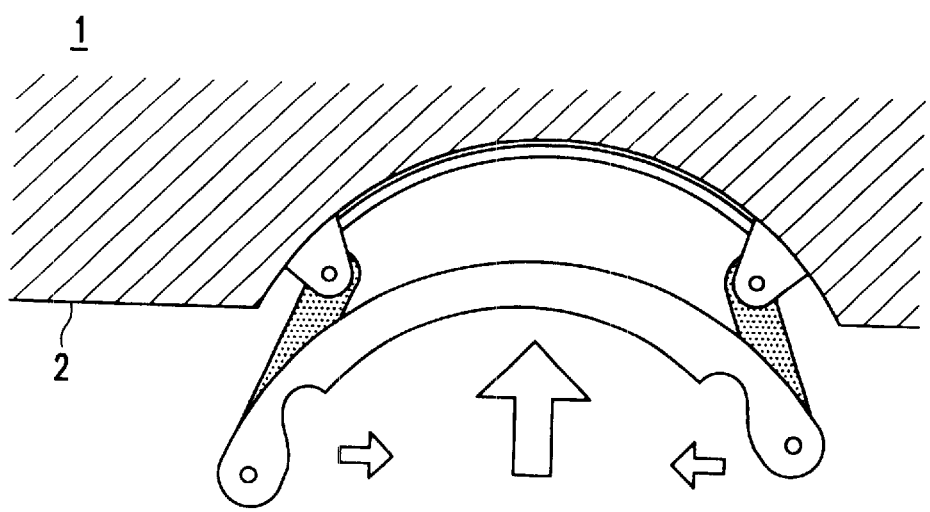
FIG. 6 represents diagrammatically the clamping action of the shoulder support.

FIG. 6 diagrammatically shows the clamping action of the third embodiment of the camera in accordance with the invention.

Figure 7:
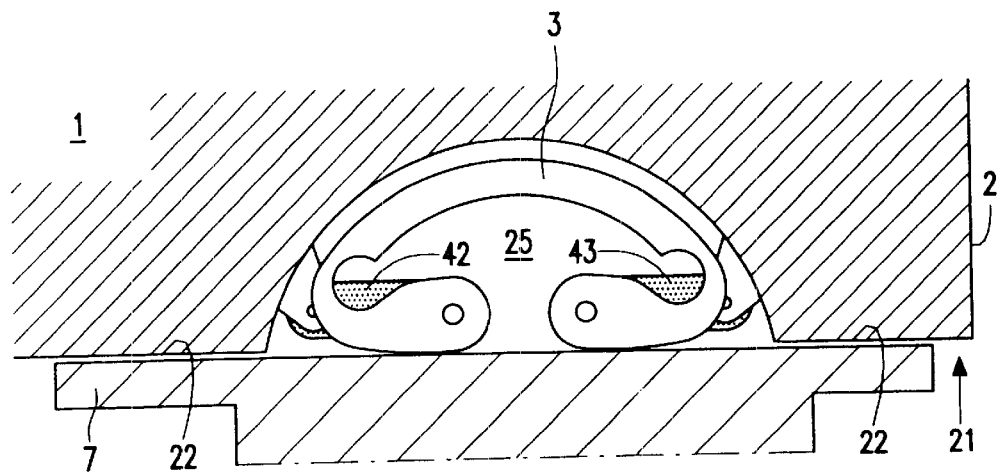
FIG. 7 shows the shoulder support in the folded-in condition, FIG. 8 diagrammatically shows the shoulder support and indicates some dimensions.

FIG. 7 shows a detail of the third embodiment of the camera in accordance with the invention while the camera 1 is mounted on a stand 7 and the shoulder support 3 is in a folded-in condition. The housing 2 has an underside 21 provided with a mounting surface 22 for mounting the camera onto the stand 7. The shoulder support 3 is situated on the underside 21 of the camera to enable the camera to be placed onto a shoulder. The housing 2 has a recess 25 in the underside 21 and the connecting member 41 and 42 are mounted in the recess. As a result of these measures, the shoulder support can be accommodated wholly in the recess 25 in its folded-in condition, so that it does not project beneath the mounting surface 22. This enables the camera 1 to be mounted directly onto the stand 7 without removal of the shoulder support from the camera 1.

Figure 8:
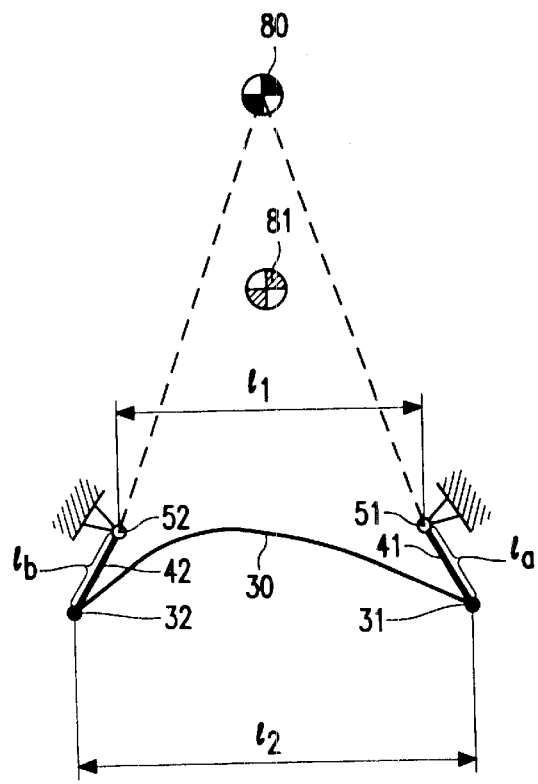

FIG. 8 diagrammatically shows the shoulder support and indicates some dimensions. The distance $l_1$ between the hinges 51 and 52 is greater than the sum of the lengths $l_a+l_b$ of the connecting members 41 and 42. As a result of these measures, the connecting members 41 and 42 do not overlap in the folded-in condition, so that the shoulder support occupies only little space in its folded-in condition. In the present embodiment the distance $l_1$ between the hinge points 51 and 52 is selected to be smaller than the distance $l_2$, while placed on a shoulder, between the point where the first connecting member 41 is secured to the carrying member 30 and the point where the second connecting member 41 is secured to the carrying member 30. This results in a virtual pivot 80 which is situated above the center of gravity 81 of the camera, thus assuring a good balance of the camera with respect to the shoulder. It has been found that good results are achieved if the distance $l_1$ is selected to be between 8 and 15 cm.

In the third embodiment of the camera in accordance with the invention the flexible carrying member 30 is hingeably attached to connecting members 41 and 42. As a result of this measure, the shoulder support can be folded in more easily. However, this measure is not necessary because the carrying member 30 is flexible.

Figure 9:
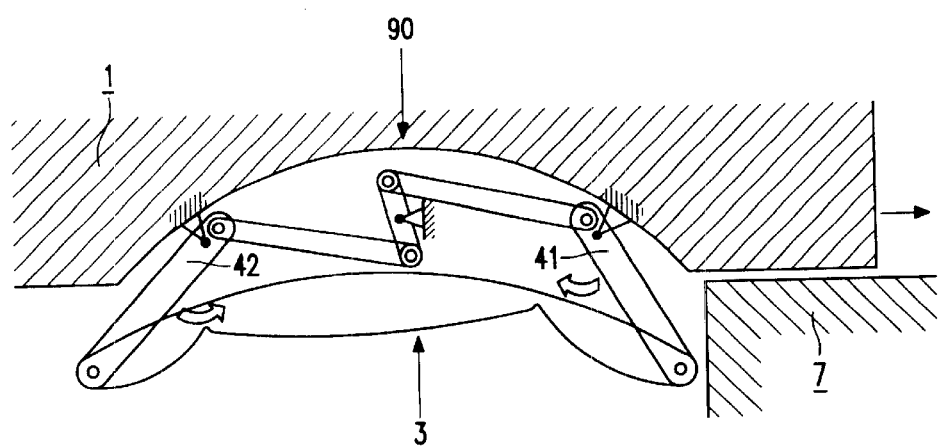
FIG. 9 shows a detail of a fourth embodiment of the camera in accordance with the invention.

FIG. 9 shows a detail of a fourth embodiment of the camera in accordance with the invention. In this embodiment the connecting members 41 and 42 are coupled via a coupling mechanism 90, which couples the movements of the first connecting member 41 and the second connecting member 42. As a result, the shoulder support 3 folds in completely when the first connecting member 41 is slid onto a stand 7, thereby allowing the camera 1 to be placed onto the stand 7 in one movement.

What is claimed is:

1. A camera comprising a camera housing and a shoulder support for supporting the camera housing on a shoulder, which shoulder support comprises a flexible carrying member having a first end and a second end and a carrying surface which is remote from the camera housing and which carrying member is adapted to flexibly cooperate with a shoulder at least along substantially all of the length of the carrying member, which carrying member is connected to the camera housing by means of a comparatively stiff and unbendable first connecting member near the first end of said carrying member, and is connected to the camera housing by means of a comparatively stiff and unbendable second connecting member near the second end of said carrying member, wherein the first connecting member is movably coupled to the second connecting member, the connecting members being coupled in such a manner that the ends of the carrying member are moveable towards one another by a pulling force generated when said camera is placed on a shoulder and said shoulder bears against the carrying member at positions between said ends of the carrying member.

2. A camera as claimed in claim 1, wherein at least one of the connecting members is hingeably connected to the camera housing.

3. A camera as claimed in claim 1, wherein the camera housing has an underside provided with a mounting surface for mounting the camera onto a stand, and the shoulder support extends near the underside.

4. A camera as claimed in claim 1, wherein the second connecting member is hingeably secured to the camera housing.

5. A camera as claimed in claim 1, wherein the camera housing has a recess in the underside, and the connecting members are secured to the camera housing at the location of the recess.

6. A camera as claimed in claim 1, wherein the connecting members have a given length and are each secured to the camera housing by means of a hinge, and the distance between the hinges is greater than the sum of the lengths of the connecting members.

7. A camera as claimed in claim 1, wherein the flexible carrying member is hingeably secured to the connecting members.

8. A camera as claimed in claim 1, wherein the flexible carrying member comprises rubber.

9. A camera as claimed in claim 1, wherein the connecting members are coupled via a coupling mechanism, which couples the movements of the first and the second connecting member.

10. A shoulder support for carrying a camera on a shoulder, which support comprises a coupling member and a flexible carrying member, the flexible carrying member having a first end and a second end hingeably connected thereto and a carrying surface which is remote from the coupling member and which is adapted to flexibly cooperate with a shoulder at least along substantially all of the flexible carrying member's length, the flexible carrying member being connected to the coupling member by means of a comparatively stiff and unbendable first connecting member near the first end of said carrying member, the flexible carrying member being connected to the coupling member by means of a comparatively stiff and unbendable second connecting member near the second end of said carrying member, and the first connecting member being movably coupled to the second connecting member, wherein the connecting members are coupled in such a manner that the ends of the carrying member are moveable towards one another by a pulling force generated when said camera is placed on the shoulder and the shoulder bears against the carrying member at positions between said ends of the carrying member.

* * * * *